United States Patent
Rosa et al.

(10) Patent No.: US 10,523,374 B2
(45) Date of Patent: Dec. 31, 2019

(54) REPETITION PROCESS CYCLING FOR GRANT-LESS OR GRANT-BASED TRANSMISSION

(71) Applicant: NOKIA TECHNOLOGIES OY, Espoo (FI)

(72) Inventors: Claudio Rosa, Randers (DK); Klaus Hugl, Vienna (AT)

(73) Assignee: NOKIA TECHNOLOGIES OY, Espoo (FI)

(*) Notice: Subject to any disclaimer, the term of this patent is extended or adjusted under 35 U.S.C. 154(b) by 0 days.

(21) Appl. No.: 15/670,803

(22) Filed: Aug. 7, 2017

(65) Prior Publication Data

US 2019/0044663 A1 Feb. 7, 2019

(51) Int. Cl.
- *H04L 1/18* (2006.01)
- *H04W 72/12* (2009.01)
- *H04L 1/16* (2006.01)

(52) U.S. Cl.
CPC .......... *H04L 1/1816* (2013.01); *H04L 1/1809* (2013.01); *H04L 1/1812* (2013.01); *H04L 1/1822* (2013.01); *H04L 1/1887* (2013.01); *H04L 1/1896* (2013.01); *H04W 72/1294* (2013.01); *H04L 1/1692* (2013.01); *H04W 72/1284* (2013.01)

(58) Field of Classification Search
CPC ... H04L 1/1816; H04L 1/1809; H04L 1/1692; H04W 72/1284; H04W 72/1294
See application file for complete search history.

(56) References Cited

U.S. PATENT DOCUMENTS

| | | | | |
|---|---|---|---|---|
| 5,648,969 A | * | 7/1997 | Pasternak | H04L 1/0057 370/349 |
| 6,934,760 B1 | * | 8/2005 | Westbrook | H04L 49/1523 709/201 |
| 8,014,463 B2 | * | 9/2011 | van Nee | H04B 7/0671 348/388.1 |
| 8,259,631 B2 | * | 9/2012 | Hwang | H04L 27/2626 370/310 |
| 9,793,965 B1 | * | 10/2017 | Pustovalov | H04B 7/0452 |
| 2002/0145974 A1 | * | 10/2002 | Saidi | H04L 49/153 370/230 |
| 2009/0016290 A1 | * | 1/2009 | Chion | H04W 72/1289 370/329 |
| 2009/0232100 A1 | * | 9/2009 | Faber | H04B 7/0817 370/334 |
| 2011/0135016 A1 | * | 6/2011 | Ahn | H04L 5/0037 375/259 |
| 2011/0205966 A1 | * | 8/2011 | Iwai | H04L 1/0021 370/328 |

(Continued)

*Primary Examiner* — Jean B Corrielus
(74) *Attorney, Agent, or Firm* — Squire Patton Boggs (US) LLP

(57) ABSTRACT

Various communication systems may benefit from the appropriate handling of multiple competing transmissions. For example, high or ultra reliable low latency communication systems may benefit from cycling hybrid automatic repeat request transmission processes for grant-less uplink transmission. A method can include identifying or predicting a plurality of pending data transmissions. The method can also include deterministically cycling the pending data transmissions among a plurality of available resources.

18 Claims, 14 Drawing Sheets

(56) References Cited

U.S. PATENT DOCUMENTS

| | | | |
|---|---|---|---|
| 2011/0222475 A1* | 9/2011 | Hole | H04W 56/0045 370/328 |
| 2013/0279452 A1* | 10/2013 | Liu | H04W 72/1268 370/329 |
| 2013/0329685 A1* | 12/2013 | Fujimoto | H04W 48/12 370/329 |
| 2016/0014034 A1* | 1/2016 | Bhushan | H04L 47/22 370/253 |
| 2016/0270102 A1* | 9/2016 | Zeng | H04W 72/1231 |
| 2016/0359594 A1* | 12/2016 | Inoue | H04L 1/1671 |
| 2017/0257865 A1* | 9/2017 | Halabian | H04L 27/2607 |
| 2018/0083758 A1* | 3/2018 | Islam | H04L 5/0083 |

* cited by examiner

REPETITION PROCESS CYCLING FOR GRANT-LESS OR GRANT-BASED TRANSMISSION

BACKGROUND

Field

Various communication systems may benefit from the appropriate handling of multiple competing transmissions. For example, high or ultra reliable low latency communication systems may benefit from cycling hybrid automatic repeat request transmission processes for grant-less uplink transmission.

Description of the Related Art

Areas of communication technology include provision of high reliability and low latency in unlicensed spectrum, as well as ultra-reliable low-latency communication (URLLC) in licensed spectrum, such as long term evolution (LTE) and/or new radio (NR). Grant-less uplink (GUL) transmission is being introduced in the second release of the MulteFire™ specifications, namely release 1.1. Grant-free uplink is also considered for standardization of New Radio in Release 15 of the 3GPP specifications, as well as part of the URLLC for LTE work. GUL can be used to reduce latency in the uplink direction of transmission.

Techniques that enable repetition or simultaneous transmission of the same data over multiple frequency resources have been proposed. For example, third generation partnership project (3GPP) R2-1700173 and 3GPP R2-1700176 describe the idea of using a carrier aggregation framework to perform transport block (TB) duplication at the medium access control (MAC) layer.

Repetition on a single carrier in the time, frequency, and/or spatial domain has been discussed in the URLLC context for NR. Scheduling blind repetitions is to be supported for NR—and blind repetition may be an integral part of the grant-less/free, such as GUL for UL operation, and grant-based or scheduled HRLL transmission operation.

In MulteFire™ 1.1, GUL for unlicensed band operation has been discussed where a GUL associated uplink control channel provides some related information of the grant-less UL transmission instance denoted with GUL uplink control information (UCI), including the hybrid automatic repeat request (HARQ) process identifier (ID). The definition of GUL resources as using configuration similar to LIE semi-persistent scheduling (SPS) operation with or without physical layer activation/modification is a part of the MulteFire™ GUL operation as well as for fifth generation (5G)/NR grant-free uplink transmissions.

SUMMARY

According to certain embodiments, a method can include identifying or predicting a plurality of pending data transmissions. The method can also include deterministically cycling the pending data transmissions among a plurality of available resources.

In certain embodiments, an apparatus can include at least one processor and at least one memory including computer program code. The at least one memory and the computer program code can be configured to, with the at least one processor, cause the apparatus at least to identify or predict a plurality of pending data transmissions. The at least one memory and the computer program code can also be configured to, with the at least one processor, cause the apparatus at least to deterministically cycle the pending data transmissions among a plurality of available resources.

An apparatus, according to certain embodiments, can include means for identifying or predicting a plurality of pending data transmissions. The apparatus can also include means for deterministically cycling the pending data transmissions among a plurality of available resources.

A non-transitory computer-readable medium can, according to certain embodiments, be encoded with instructions that, when executed in hardware, perform a process. The process can include identifying or predicting a plurality of pending data transmissions. The process can also include deterministically cycling the pending data transmissions among a plurality of available resources.

A computer program product, in certain embodiments, can encode with instructions for performing a process. The process can include identifying or predicting a plurality of pending data transmissions. The process can also include deterministically cycling the pending data transmissions among a plurality of available resources.

BRIEF DESCRIPTION OF THE DRAWINGS

For proper understanding of the invention, reference should be made to the accompanying drawings, wherein.

DETAILED DESCRIPTION

Certain embodiments deal with user equipment (UE) behavior when having multiple URLLC data packets for transmission and how to utilize the available GUL or scheduled resources most efficiently. Moreover, certain embodiments also relate to how to map the HARQ processes/ HRLLC data packets on the available resources on subsequent subframes/slots/resources in case the UE is having several pending HRLLC data packets including their blind repetitions on the available resources.

In unlicensed spectrum, there can be a problem of listen before talk (LBT) failure, but certain embodiments, at least in some aspects, may also be applicable to operation in licensed spectrum for URLLC for LTE as well as NR.

To enable highly reliable or ultra-reliable communication, there may be a need to increase data redundancy in order to improve reliability. For example, this increase may be accomplished by providing repetition of the transmissions in the time and/or frequency or carrier domain, as mentioned above.

Certain embodiments provide a solution for managing the transmissions of several pending highly reliable low latency (HRLL) data packets on the available transmission resources in uplink using repetition. This solution may decrease the effect of LBT failure for unlicensed band operation on the transmissions of pending data packets. This solution may also reduce the overall transmission latency by providing the shortest possible decoding times for licensed and unlicensed band HRLLC data communication in case multiple HARQ processes carrying HRLL data need to be transmitted over a certain allocation of transmission opportunities spanning several contiguous subframes by transmitting each HARQ process as earliest as possible, at least once.

Though the presented problem is particularly relevant for grant-less uplink transmissions, the provided solution may also be applicable to scheduled transmission on consecutive subframes/slots.

Figure 1:
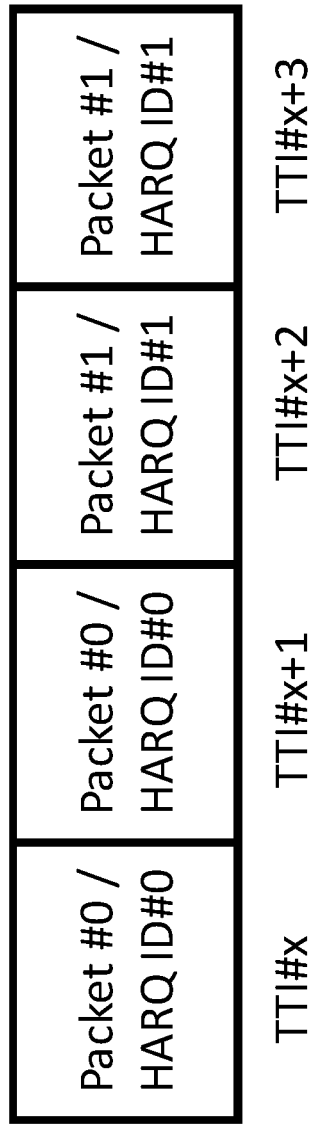
FIG. 1 illustrates sequential mapping of transmissions of HRLLC data packets.

FIG. 1 illustrates sequential mapping of transmissions of HRLLC data packets. A straightforward solution assuming a single carrier would be to transmit the HARQ processes in sequential order including all the repetitions. As an example, there may be two pending HRLL data packets, packet #0/HARQ ID#0 and packet#1/HARQ ID#1, and two repetitions, as shown in FIG. 1.

Specifically for unlicensed band operation, with the possibility to not get access to the channel due to LBT failure, the operation according to the example in FIG. 1 has some drawbacks. Assume, as an example, that the UE first gets access to the unlicensed band channel in TTI#x+2.

Figure 2B:
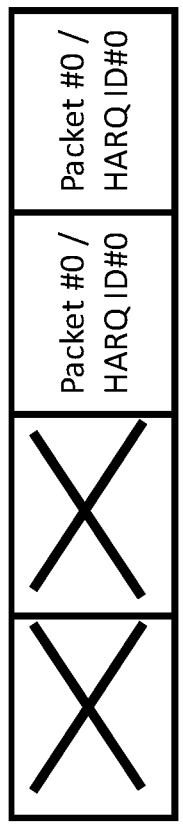
FIGS. 2a and 2b illustrate possible results in a sequential mapping case.
Figure 2A:
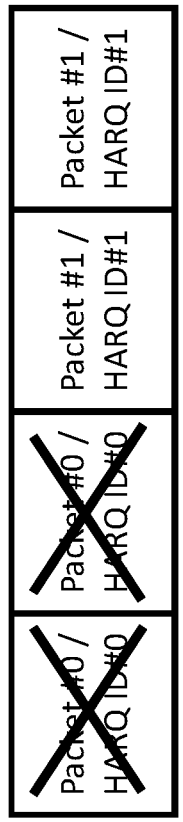

FIGS. 2a and 2b illustrate possible results in a sequential mapping case. In case of GUL transmission, if the UE is not able to change the prepared data any longer, the UE will drop both transmissions of data packet #0 and will only be able to transmit both repetitions of packet #1, as shown in FIG. 2a. Alternatively, in case the UE is able to change the allocation of the data packets to the available resources based on the LBT outcome dynamically, the UE would relocate the two transmissions of data packet#0 to the two last GUL subframes (TTI#x+2 and TTIx#3) as shown in FIG. 2b. In case of scheduled multi-subframe transmission with blind repetitions, operation as in FIG. 2a is the default assumption.

Both cases have the effect that only a single data packet is transmitted reliably and with low latency. By contrast, one of the data packets will need to wait for the next transmission opportunity, thereby increasing the latency of the dropped packet for transmission.

Another solution is that the evolved Node B (eNB) does HARQ process/data packet cycling and includes, for each transmission, an independent grant for scheduled transmission, or that the GUL uplink control information including HARQ process ID is separately included in each transmission. This may be the case for GUL transmission, but possibly also extendable to scheduled transmissions. In this way, the eNB knows the exact mapping of the HARQ process from the UCI. The main drawback of this solution is the increase in signaling overhead for scheduled transmissions and the impossibility to perform soft combining in case the UCI of a retransmission cannot be detected, as the eNB may not have information on when a retransmission is going to be sent. Certain embodiments may generically solve these and other issues, as laid out below.

In particular, certain embodiments provide a deterministic cycling of pending HRLLC data transmissions. This deterministic cycling may prevent negative effects of LBT failures (for unlicensed band operation) as well as decreasing the decoding latency overall (for licensed spectrum operation too) as each of the HRLLC data packets will be at least transmitted once as early as possible.

Figure 3B:
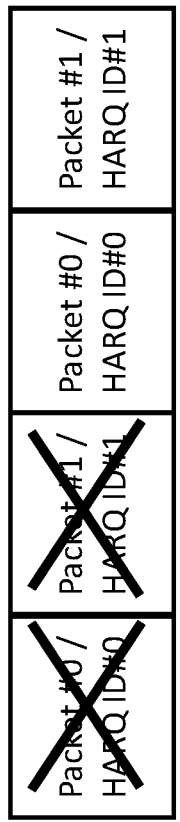
FIGS. 3a and 3b illustrate possible results in a cycling case, according to certain embodiments.
Figure 3A:
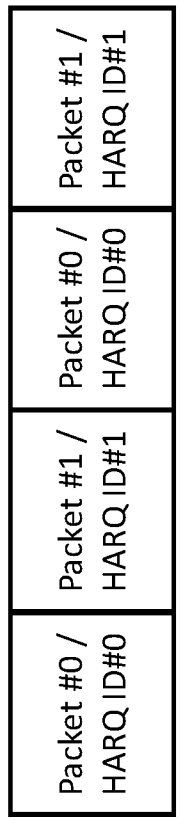

FIGS. 3a and 3b illustrate possible results in a cycling case, according to certain embodiments. In the simple example of having four time domain resources available with two data packets each having two transmission instances, a cycling between the HARQ processes/data packets can be performed as shown in FIG. 3a. Although if LBT fails for the first two GUL transmission opportunities (as in case of FIGS. 2a and 2b above), each of the data packets would still transmitted at least once as shown in FIG. 3b.

But even for a licensed band carrier, not having the issue with LBT as such, such cycling over the pending HRLL data packets can decrease the overall latency of the URLLC operation, as each transmission will have a certain probability of being able to be received correctly after the first/initial transmission of a data packet without the blind repetition.

The focus of the discussions and examples is on the case of multiple resources in the time domain, this focus is simply for ease of explanation and illustration. The same principles can be expanded and applied to cases with multiple resources in the frequency, carrier, and/or spatial domain.

Figure 4:
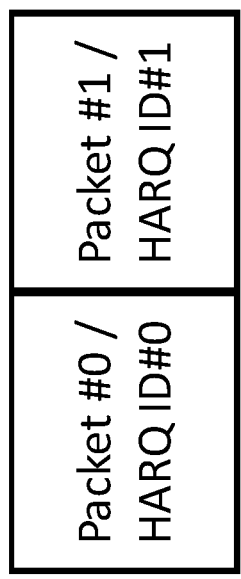
FIG. 4 illustrates an example of two GUL resources defined for a certain transmission time instance (TTI), according to certain embodiments.
Figure 4:
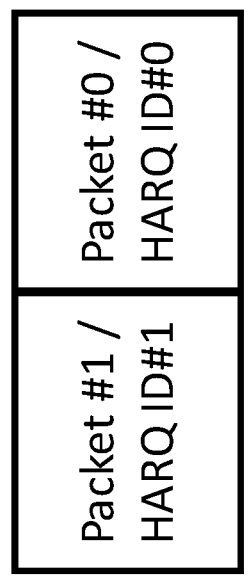

FIG. 4 illustrates an example of two GUL (frequency) resources defined for a certain transmission time instance (TTI), according to certain embodiments. More particularly, FIG. 4 illustrates cycling in two dimensions, namely time and GUL (frequency) resource. Even though this is an example for GUL resources, the principles of the example may also be applicable to scheduled transmissions. The two instances could be different carriers as discussed in R2-1700173 and R2-1700176, different resources on the same carrier such as different non-overlapping frequency resources, or using different spatial domains for transmission, such as beams from the same node, transmission from a different node, or the like.

Again, as it can be seen from FIG. 4, in case the UE would not get access to the unlicensed band channel in TTI#x, all the pending data packets would be transmitted when getting access to the channel in TTI#x+1. The same applies in case the two GUL resources would be on different carriers, and the UE is only able to get access to one of the carriers, such as getting access to one of the GUL resources.

Although LBT failure is not present for licensed band operation, a similar issue of not being able to use all the available resources in a certain TTI might be also present in case of uplink (UL) transmission (TX) power limitation. In such a case, the UE might be required to bundle its available TX power on fewer resources than configured. For example, in the illustrated case of FIG. 4, the UE may only be able to transmit on the 1st GUL resources due to UL TX power limitations.

As described above, certain embodiments use TB/HARQ process cycling over the available HRLLC transmission resources when having several HRLL data packets for transmission pending. The following provides some additional details of the operation as well as implementation to enable such cycling operation, also taking into account specifically the needed signaling. The case of scheduled transmission for DL/PDSCH HRLLC and UL/PUSCH HRLLC data can be separately considered from the case of grant-free UL/GUL transmission by the UE.

For the case of scheduling based HRLL data DL/PDSCH transmission to enable the cycling, the following operation is envisioned. The cycling operation can either be fixed in the specification for HRLL operation or can be UE-specifically configured by the eNB for the UE. The eNB can schedule multiple HRLLC DL data transmissions to the UE containing different (HRLL) HARQ processes/HRLL data blocks.

According to a first option, referred to for ease of reference as DL HRLL Option 1, accompanied with each data transmission on some HRLL resource, the eNB can send the related DL control information for this transmission only. The related DL control information can include, for example, the resource allocation, the HARQ ID, the new data indicator (NDI) and redundancy version (RV), to name a few, specific of the HRLLC in a certain TTI. This option can be regarded as fully eNB implementation specific, and for this operation neither the cycling would need to be specified nor the UE would need to be specifically configured.

Figure 5:
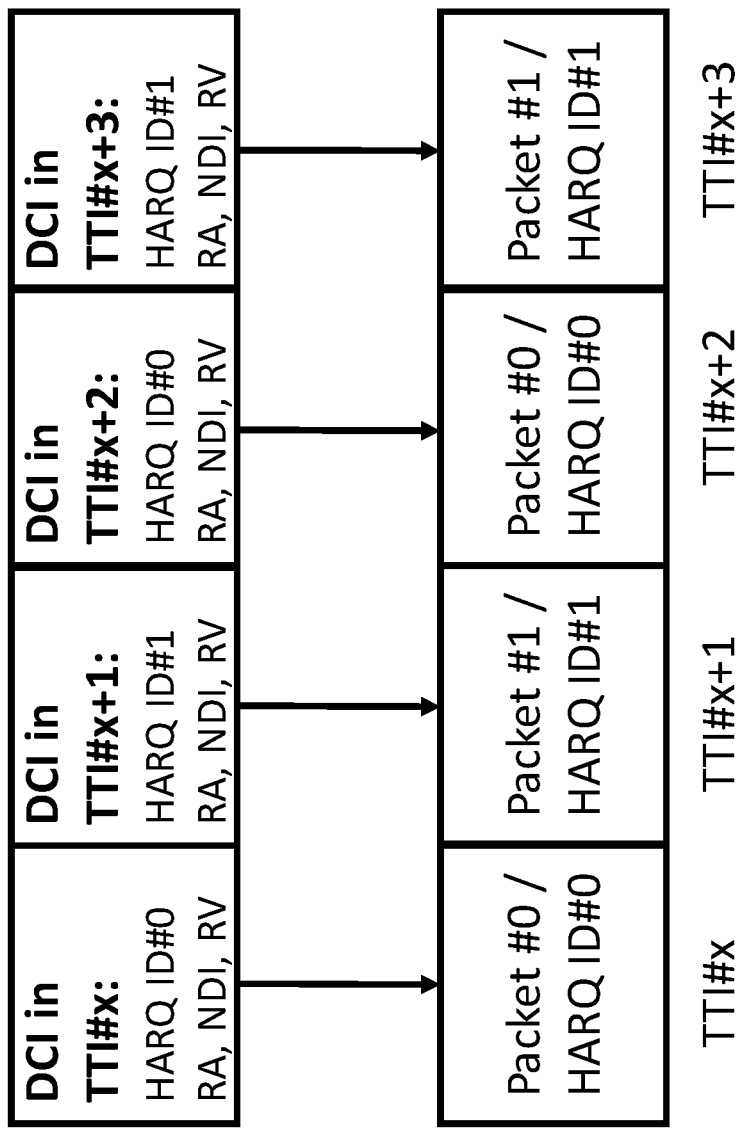
FIG. 5 illustrates an example of DL HRLL Option 1, according to certain embodiments.

FIG. 5 illustrates an example of DL HRLL Option 1, according to certain embodiments. As can be seen from the example, there can be individualized DL control information for each transmission. One drawback of this solution is that in case a DL assignment is missed, the transmission cannot be used by the UE to decode the physical downlink shared channel (PDSCH) indicated in the DCI/DL assignment.

According to a second option, referred to for ease of reference as DL HRLL Option 2, the DL control can be modified to include the scheduling information of several re-transmissions of a single HRLL data block or HARQ process, which may also improve the DL control reliability of the HRLL data communication.

Figure 6:
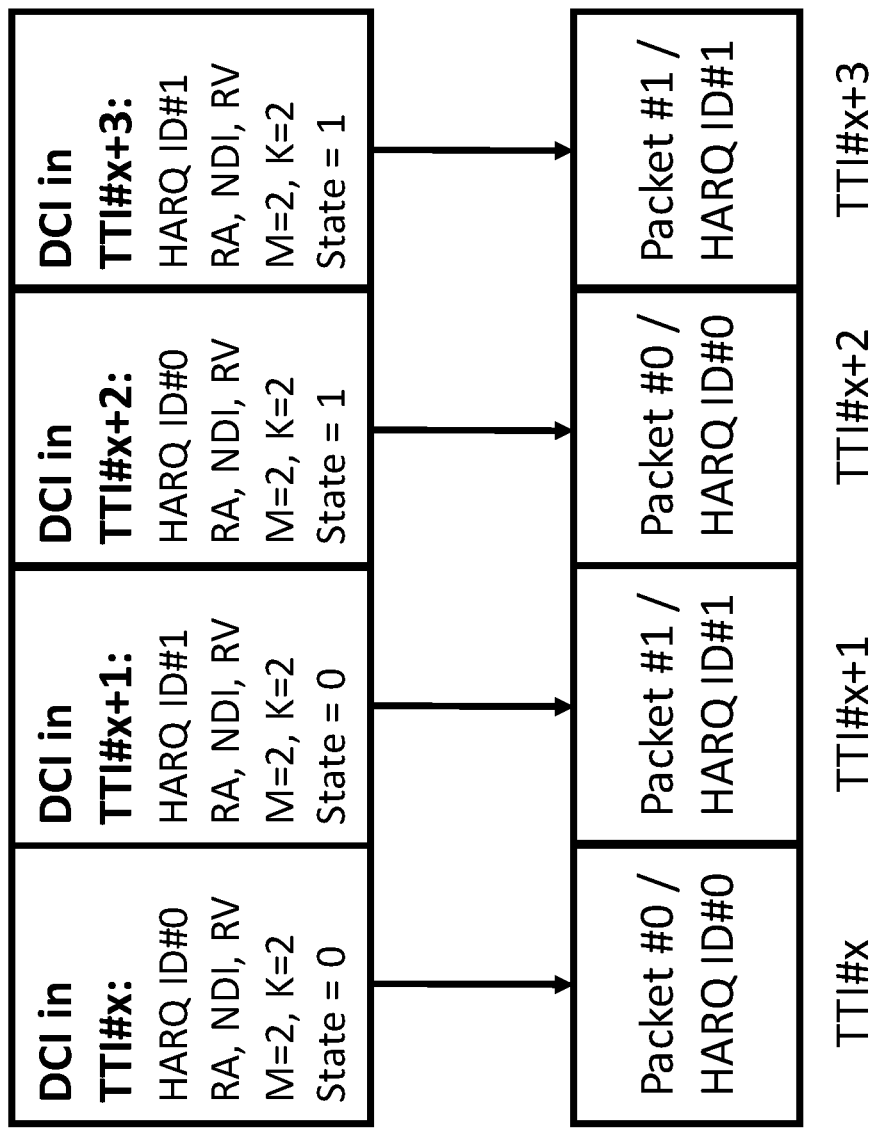
FIG. 6 illustrates an example of DL HRLL Option 2, according to certain embodiments.

FIG. 6 illustrates an example of DL HRLL Option 2, according to certain embodiments. As can be seen from the example, the resources of each of K transmissions can be included in the grant explicitly. This can result in larger DL control overhead/larger DCI/DL assignment size as several HRLL transmission resources may be explicitly signaled. This greater initial overhead may enable the envisioned cycling as only every second or third available transmission resource may be explicitly signaled for the single HARQ process.

Having some implicit rule on the resources of the K transmissions may reduce the DCI size and therefore may lead to increased DL control reliability. To implement such a rule, some changes in the DL control may be needed, as the UE may need to be informed that, for example, only every second or third HRLL transmission resource is used for the indicated HRLL data packet/HARQ process. Such addition on only using every second or third resource is shown in FIG. 6, where the field M indicates that for the indicated HARQ ID/packet only every M-th transmission resource is used (in the example, M=2) and K=2 transmissions from a single packet/HARQ ID are scheduled. Moreover, in the downlink control information the state of the transmission of the single data packet/HARQ ID can be included in order for the UE to differentiate the K=2 transmissions. For example, state=0 can be signaled in the first DCI of a HARQ process/data packet such as in TTI#x and TTI#x+2, while state=1 can be signaled in the second DCI of a HARQ process/data packet such as in TTI#x+1 and TTI#x+3.

According to a third option, referred to for ease of reference as DL HRLL Option 3, a single DCI may indicate the scheduling of more than one HRLL data packet or HARQ process, including blind repetition as well as the envisioned resource cycling. This can be regarded as a combination of HRLLC multi-subframe/resource of a single HARQ process and multi-HARQ process scheduling denoted in LTE terms "multi-subframe scheduling" as specified for UL licensed assisted access (LAA) and MulteFire™ and discussed also for NR.

As an example here, the DCI can at least contain the following information: DL resources of all the transmissions, either implicitly based on RA of the first resource or explicitly; the number of HRLL data blocks or HARQ processes, M, plus HARQ ID of the first transmitted process or alternatively, several HARQ IDs, in which case the number of HARQ IDs M can then directly determine the number of processes for cycling; the number envisioned transmissions for each HARQ process, K; the state of the transmission, for example if this is the x-th DL control message, this may implicitly tell the UE the current transmission state; and/or other information such as defining the RV, NDI, or the like.

Figure 7:
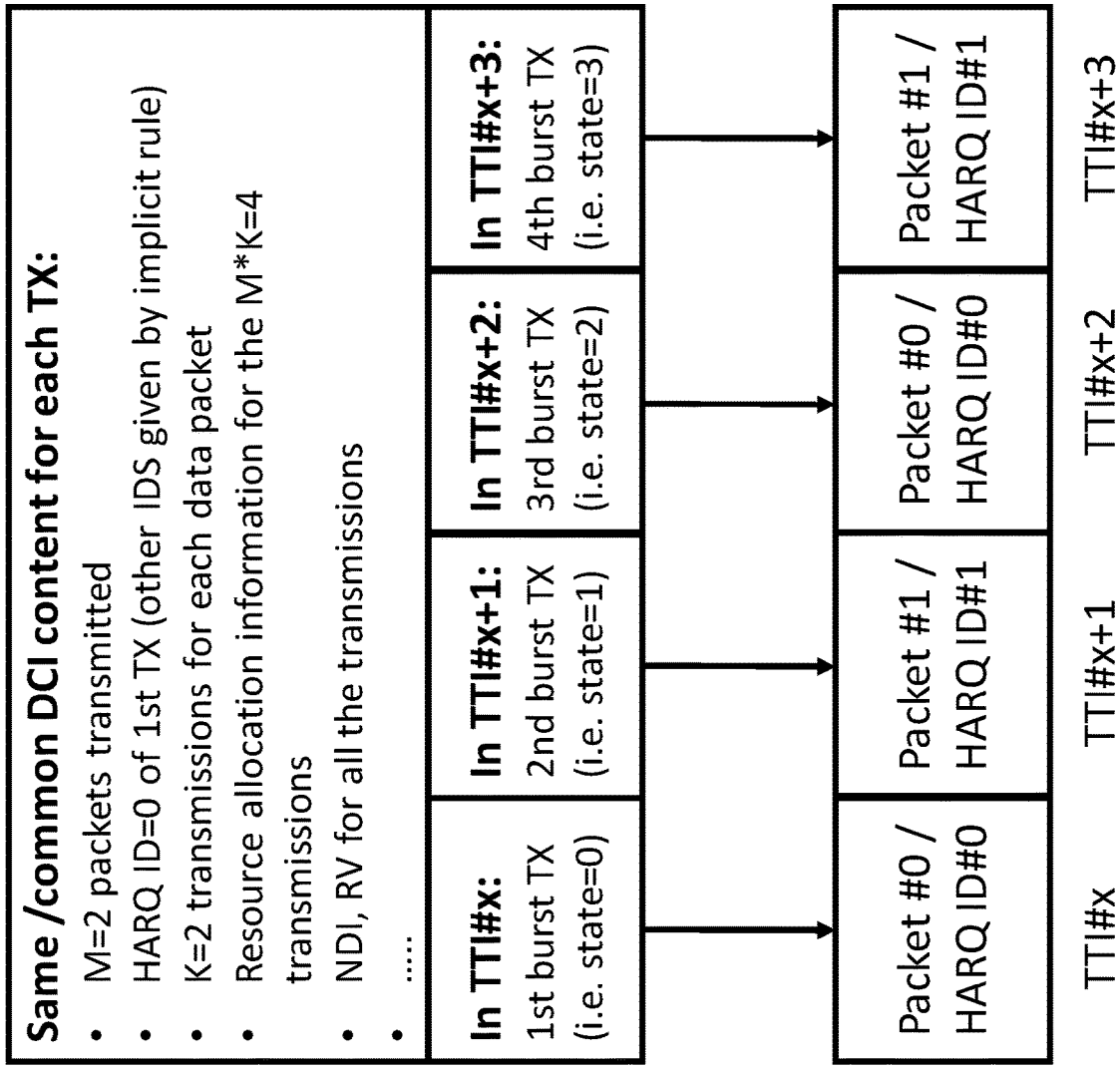
FIG. 7 illustrates an example of DL HRLL Option 3, according to certain embodiments.

FIG. 7 illustrates an example of DL HRLL Option 3, according to certain embodiments. The principle of operation of DL HRLL Option 3 is shown in FIG. 7, for the example of K=2 transmissions of M=2 data blocks. As can be seen from FIG. 7, based on the DL control information, the UE will be aware of all the scheduled HRLL data. In the case of Option 3, the UE can know based on a single correctly received DL control information about the transmission instances of all the data packets and can try to decode the DL HRLL data of more than one HRLL data block. Thus, FIG. 7 shows DL HRLL Option 3 signaling enabling HARQ cycling and joint indication of DL scheduling of several HRLL data packets including their repetitions.

For the case of grant-less/grant-free (GUL) scheduling based HRLL data UL/PUSCH transmission to enable the cycling, the following operation is envisioned. The cycling operation either can be fixed in the specification for HRLL operation or can be UE specifically configured by the eNB for the UE. The UE may have M data packets to transmit and may be able to use N transmission resources. This transmission resource usage may either be based on configuration of the grant-free transmission including frame structure specifics, or be based on a combination of unlicensed band channel access and GUL resources.

Figure 8:
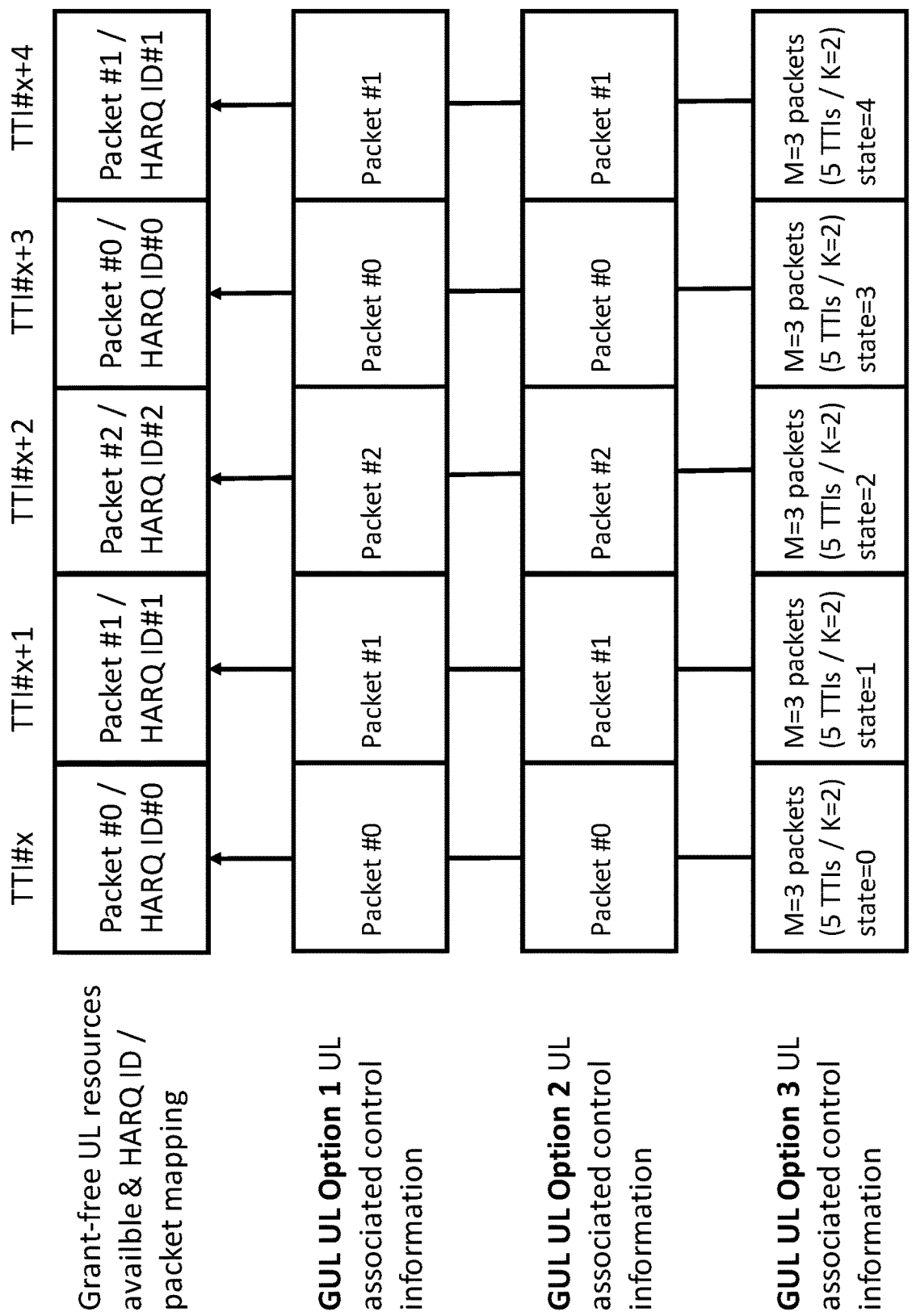
FIG. 8 illustrates GUL UL Options 1 to 3 for the example of M=3 data packets and N=5 available resources, according to certain embodiments.

The selection of which packet to transmit in which GUL resource can be up to the UE. The UE can use the cycling mapping of the M data packets over the N resources and can indicate in some UL data associated control channel required for GUL, such as the MulteFire™ GUL UCI or similar, the mapping of packets to the available resources. Again, the three different cases can be considered. FIG. 8 illustrates GUL UL Options 1 to 3 for the example of M=3 data packets and N=5 available resources, according to certain embodiments. These labels of GUL UL Option 1, GUL UL Option 2, and GUL Option 3 are for ease of reference only, and do not imply chronological or other priority.

In GUL Option 1, there can be an independent indication for each UL resource/transmission instance. The reliability of the operation may rely on the UL control/GUL UCI detection performance of each transmission instance. This example is shown in FIG. 8 as GUL Option 1. Assuming the GUL UCI introduced in MulteFire™ 1.1 specifications will include at least the HARQ ID, this option can be considered as UE implementation specific, and as such neither the cycling would need to be specified nor the UE would need to be specifically configured.

In the case of GUL Option 2, the GUL UL control signaling can be indicated for each HARQ process separately but can include information for all the transmission instances, similarly as the eNB would indicate for DL HRLL Option 2 the cycling in its DL assignment. This example is shown in FIG. 8 as GUL Option 2.

In the case of GUL Option 3, the GUL UL control signaling in each transmission can include all the GUL transmission information for the full GUL transmission burst. This can include the number of HARQ processes, M, as well as the current state within the process. In addition, it may include the GUL burst length, namely the number of used GUL resources, if not given or known by the eNB otherwise, and/or the number of transmissions for a packet, if not configured or given by the number of resources or the burst length implicitly. This example is shown in FIG. 8 as GUL Option 3.

As can be seen from the signaling example for GUL Option 3 in FIG. 8, there is some common uplink control information included in each of the transmission instances, such as the HARQ ID of the first transmitted packet, if not given implicitly, the number of data packets M in the GUL burst as well as the number of GUL transmissions in a GUL burst and the repetition factor for a packet, if not given otherwise. Virtually the only thing in the UCI information that may be changing from GUL transmission resource to GUL transmission resource is the state, which tells the how-many-th GUL transmission within the GUL burst this actually is.

Based on the available information in the UL control information, such as the GUL UCI, the eNB may be able to receive the transmitted UL GUL transmission of HRLL data packets. Depending on the GUL Option chosen, the reliability of the UL control channel or GUL UCI, may have more or less effect on the HRLL latency and reliability.

For the case of scheduling based HRLL data UL/PUSCH transmission to enable the cycling, the following operation is envisioned. The cycling operation either can be fixed in the specification for HRLL operation or can be UE specifically configured by the eNB for the UE.

According to a first alternative, labelled Alternative UL1-UL URLLC without UE modification, the UE can just execute the scheduled UL for several data packets assuming the eNB is aware of the number of HRLL data packets that need to be transmitted. The eNB can schedule multiple HRLLC UL data transmissions to the UE containing different (HRLL) HARQ processes/HRLL data blocks.

Within this first alternative, at least three options are possible, which are labelled UL HRLL Option 1A through 1C, for ease of reference only. In UL HRLL Option 1A, similar to DL HRLL DL Option 1 and viewable as the UL equivalent of DL HRLL Option 1, for each scheduled UL data transmission on some HRLL resource, the eNB can send the related DL control information for this scheduled transmission only. This approach can be regarded as fully eNB implementation specific. For this operation, neither the cycling would need to be specified nor would the UE need to be specifically configured. One drawback of this solution is that in case a UL grant is missed, the UE may not use the transmission resources. The principle of this Option 1A operation is as shown in FIG. 5 for DL, with the difference that the DCI information does not relate to the PDSCH transmission by the eNB of HRLL data packets but instead can relate to the UL grant/scheduling information for PUSCH transmissions by the UE.

In UL HRLL Option 1B, similar to DL HRLL DL Option 2 and viewable as the UL equivalent of DL HRLL Option 2, the DCI scheduled UL can be modified to include the scheduling information of several blind re-transmissions of a corresponding data packet, up to for example K transmissions, of a single HRLL data block in UL. This approach may also improve the DL control reliability of the HRLL data communication.

The resources of each of the K transmissions can be included in the grant explicitly. This may result in larger DL control overhead/larger DCI/DL assignment size as several HRLL transmission resources can be explicitly signaled. The explicit resource grant indication can enable the envisioned cycling as, for example, only every second or third available transmission resource can be explicitly signaled for the single HARQ process.

For having some implicit rule on the resources of the K transmissions, which reduces the DCI size and therefore will lead to increased DL control reliability, some changes in the DL control may be applied. For example, the UE can be informed that, for example, only every second or third HRLL transmission resource is used for the indicated HRLL data packet/HARQ process. The principle of this Option 1B operation is as shown in FIG. 6 for DL, with the difference that the DCI information does not relate to the PDSCH transmission by the eNB of HRLL data packets but instead can relate to the UL grant/scheduling information for PUSCH transmissions by the UE.

In UL HRLL Option 1C, similar to DL HRLL DL Option 3 and viewable as the UL equivalent of DL HRLL Option 3, a single DCI can indicate the scheduling of more than one HRLL data packet, including blind repetition as well as the envisioned resource cycling. This is then somehow to be regarded as a combination of HRLLC multi-subframe/resource of a single HARQ process and multi-HARQ process scheduling, which can be denoted in LTE terms "multi-subframe scheduling," as specified for UL LAA and MulteFire™ and also discussed for NR.

As an example, the DCI can at least contain the following information: UL resources of all the transmissions, either explicitly or implicitly based on RA of the first resource; number of HRLL data blocks or HARQ processes, M, plus HARQ ID of the first transmitted process or alternatively, several HARQ IDs, where the number of HARQ IDs M may then directly determine the number of processes for cycling; the number of envisioned transmissions for each HARQ process, K; the state of the transmission, for example if this is the x-th DL control message associated with a certain UL resource, that fact may implicitly tell the UE the current transmission state; and/or other information such as defining the RV, NDI, or the like.

The principle of this Option 1C operation is as shown in FIG. 7 for DL, with the difference that the DCI information does not relate to the PDSCH transmission by the eNB of HRLL data packets but instead can relate to the UL grant/scheduling information for PUSCH transmissions by the UE.

Based on the DL control information, the UE can be aware of the scheduled HRLL data. In case of Option 1B or specifically of Option 1C, the UE can know based on a single correctly received DL control information about the scheduled transmission instances of the corresponding HRLL data packet (in case of Option 1B) or all the HRLL data packets (in case of Option 1C) it is requested to transmit during the PUSCH transmission burst.

One issue with this operation is that the eNB might not be aware of how many UL HRLL data packets the UE currently has in its buffer for transmission. Therefore, any scheduling by the eNB might not be able to take a change in the buffer status of the UE into account. This issue can be addressed by an UL scheduling based solution including UE modification of the number of UL HARQ processes/instances based on the scheduled multiple UL resources for HRLL data into account, as discussed in Alternative 2 below.

Figure 9:
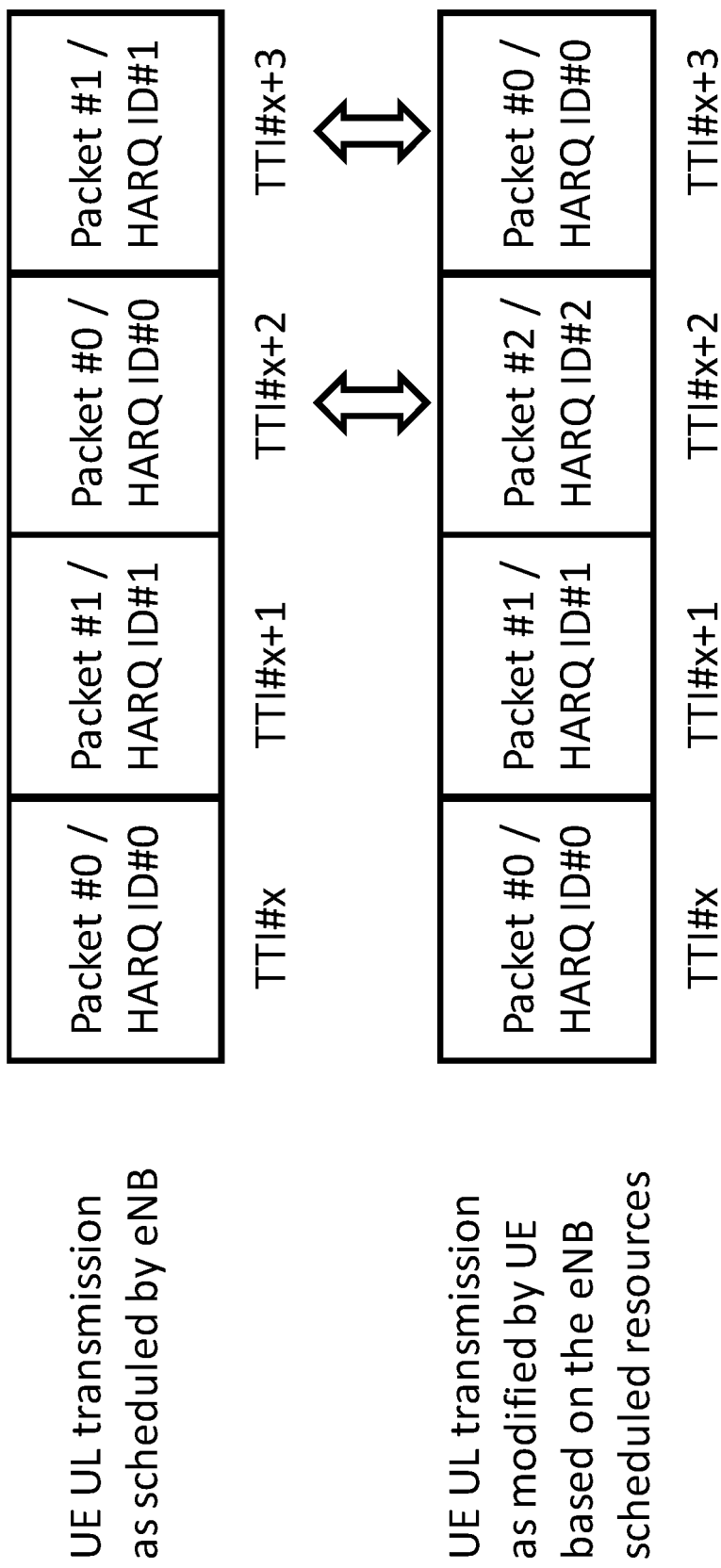
FIG. 9 illustrates change in HARQ process/data to resource mapping, according to certain embodiments.

Specifically, in Alternative UL 2, the UE may be able to change/modify the allocated HARQ processes/HRLLC data packets based on the granted UL transmission resources. As noted above, when scheduling resources the eNB may not be aware of the number of HRLL data packets. Therefore, if the UE executes the UL transmission as scheduled, such as described in UL Alternative 1 above, the cycling may not be possible there. Based on allocated resources for HRLL transmission by the eNB, the UE might decide to change the mapping of HARQ processes/HRLL data packets to the allocated resources for transmission and indicate this to the eNB using some UL associated control, such as the Multe-Fire™ GUL UCI or similar. The principle of this operation is shown in FIG. 9 for the example of M=2, K=2 being scheduling by the eNB and the UE having actually 3 packets for transmission pending. The UE will modify the allocation and needs to inform the change in the HARQ process/HRLL data packet mapping for the 3rd and 4th scheduled resource/TTI in order to enable the envisioned cycling of the three pending HRLL data packets.

Thus, FIG. 9 illustrates change in HARQ process/data to resource mapping, according to certain embodiments. More particularly, FIG. 9 illustrates the change in HARQ process/data to resource mapping by the UE in TTI#x+2 (from packet #0 to packet #2) and TTI#x+3 (from packet #1 to packet #0) to enable the envisioned cycling of the pending HRLL data packets.

As shown in FIG. 9, there may be a need by the UE to indicate the change in the third and fourth scheduled resource using some associated UL control signaling. For the signaling, again several options can be considered here, which are labelled for convenience as UL Options 2A, 2B and 2C.

In UL HRLL Option 2A, the UE can indicate the change for each UL resource independently. This may be similar to the DL control operation for UL HRLL Option 1A and DL HRLL Option 1. Therefore, the UE may only need to signal in TTI#x+2 and TTI#x+3 the Packets #2/HARQ ID#2 and #0 are transmitted instead of the scheduled HARQ ID#0 and #1. Therefore, there may only be a need for the data associated UL control signaling, such as the MulteFire™ GUL UCI, on scheduled resources where a change has happened. The eNB can look for a UE configured for such operation for the associated UL control signaling, and if this is not found, the eNB can assume the scheduled mapping. If the eNB is able to decode the data associated UL control signaling, indicating the change, the eNB can know that a new packet is transmitted and can do the decoding accordingly.

Figure 10:
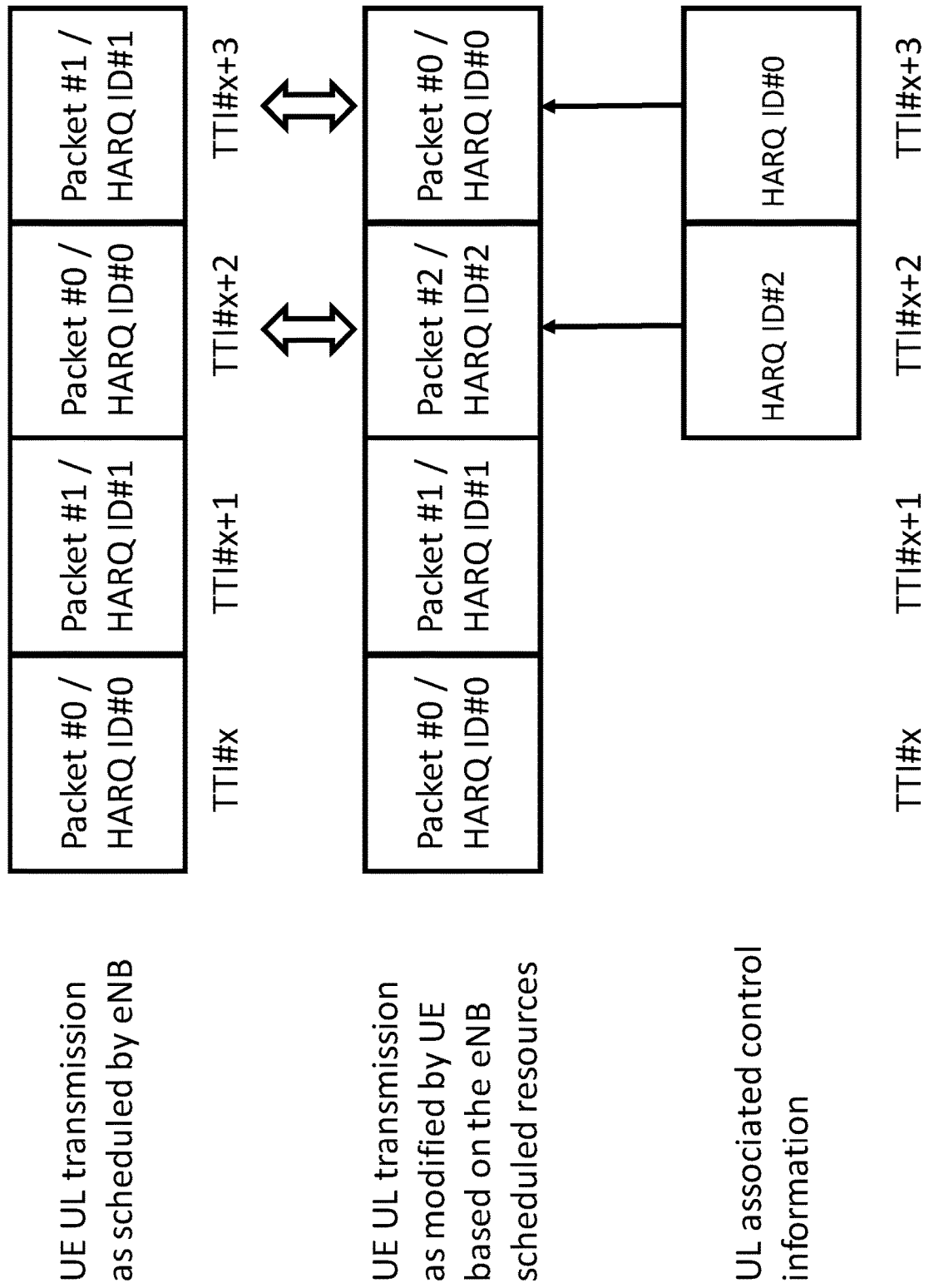
FIG. 10 illustrates one example of UL HRLL Option 2A, according to certain embodiments.

FIG. 10 illustrates one example of UL HRLL Option 2A, according to certain embodiments. More particularly, FIG. 10 illustrates an example for a change from M=2 to M=3 data packets, where the change is signaled by associated UL control signaling in TTI#x+2 and TTI#x+3.

As discussed earlier, this operation mode relies on the eNB reliably detecting the associated UL control signaling on the resources where there is change. If the eNB fails to decode/identify such signaling, the eNB may wrongly assume a different HARQ process/data packet to be transmitted and may wrongly do the decoding. In the example of FIG. 10, if the eNB fails to decode the control signaling in TTI#x+2 it will assume HARQ ID#0 transmitted and will try to soft-combine the two scheduled transmissions of the same data packet, which may lead to corruption of the soft-bits at the eNB receiver for this transport block. To prevent this, again similar as in the case of the combined signaling of several transmission options of the same process, the reliability could be increased as laid out in the UL HRLL Options 2B and 2C below.

Figure 11:
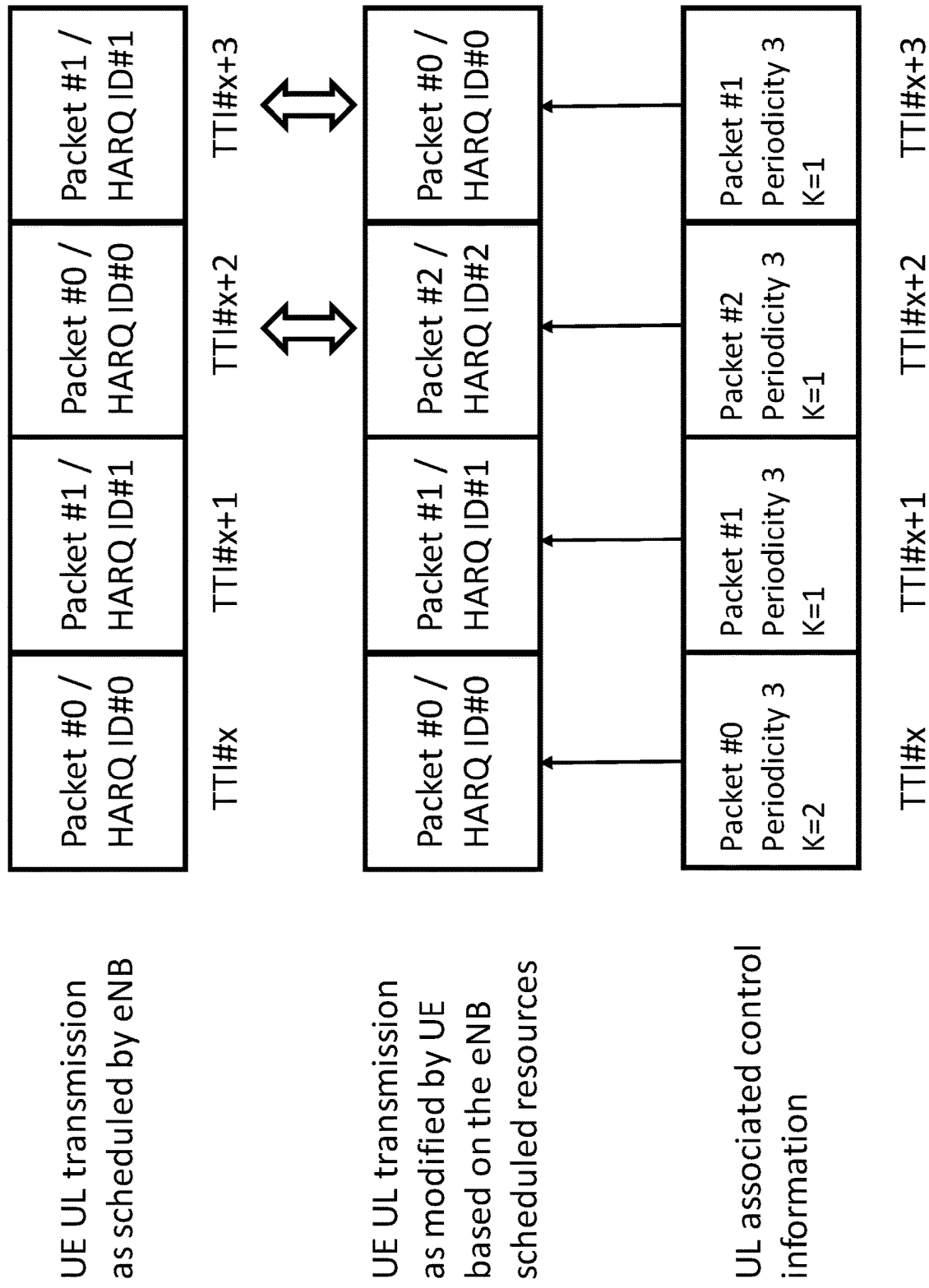
FIG. 11 illustrates an example of UL HRLL Option 2B, according to certain embodiments.

UL HRLL Option 2B may be similar to the UL HRLL Option 1B. In this option, the signaling can include the information of the transmitted packet only but include all the transmissions (incl. blind repetition) of the data packet. FIG. 11 illustrates an example of UL HRLL Option 2B, according to certain embodiments. Specifically, as shown in FIG. 11 the UE can indicate in each transmission instance the packet ID as well as all the packet's transmissions within the burst. If the eNB is not identifying any associated UL control signaling, the eNB can again assume the HARQ ID to transmission instance mapping as scheduled.

Figure 12:
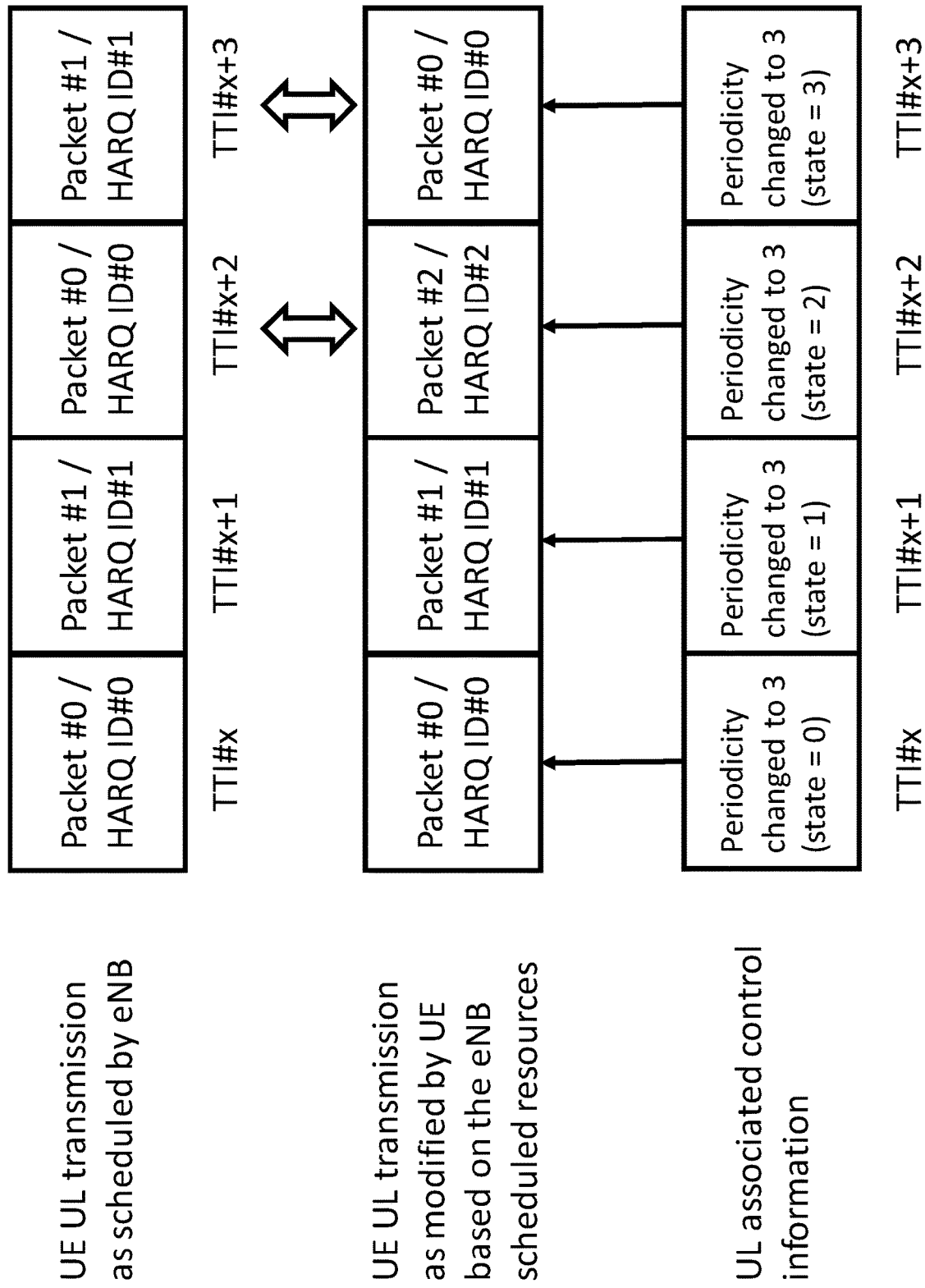
FIG. 12 illustrates one example of UL HRLL Option 2C, according to certain embodiments.

UL HRLL Option 2C may be similar as the UL HRLL Option 1C. FIG. 12 illustrates one example of UL HRLL Option 2C, according to certain embodiments. In this option, the signaling would include the information of the all the transmitted packets in the scheduled burst taking into account the scheduling information provided. As the UE is aware of the full scheduled burst, it would just need to indicate the change from M=2 to M=3 data packets on the scheduled resources—all other information would be automatically given with the combination of the providing scheduling information by the eNB. Therefore, the same UL control information would be repeated in all the UL transmission instances as shown in FIG. 12 below. If the eNB is not identifying any associated UL control signaling, it would again assume the HARQ ID to transmission instance mapping as scheduled.

For the case of unlicensed band LBT issue, the signaling for the UL HRLL Option 2C may further include the transmission state within the HRLL UL transmission burst in order for the eNB to be able to identify the mapping of HARQ ID to UL resource due to the uncertain LBT/CCA outcome.

The examples in this UL Alternative 2 assume there is a change in the number of packets to be transmitted and that all the scheduled UL TX resources can be used. In case the UL LBT is failing, it may be the case that the UE would also like to change the HARQ process to resource/transmission instance mapping. For such operation, the same signaling principles UL Options 2A, 2B and 2C can also be used.

Figure 13:
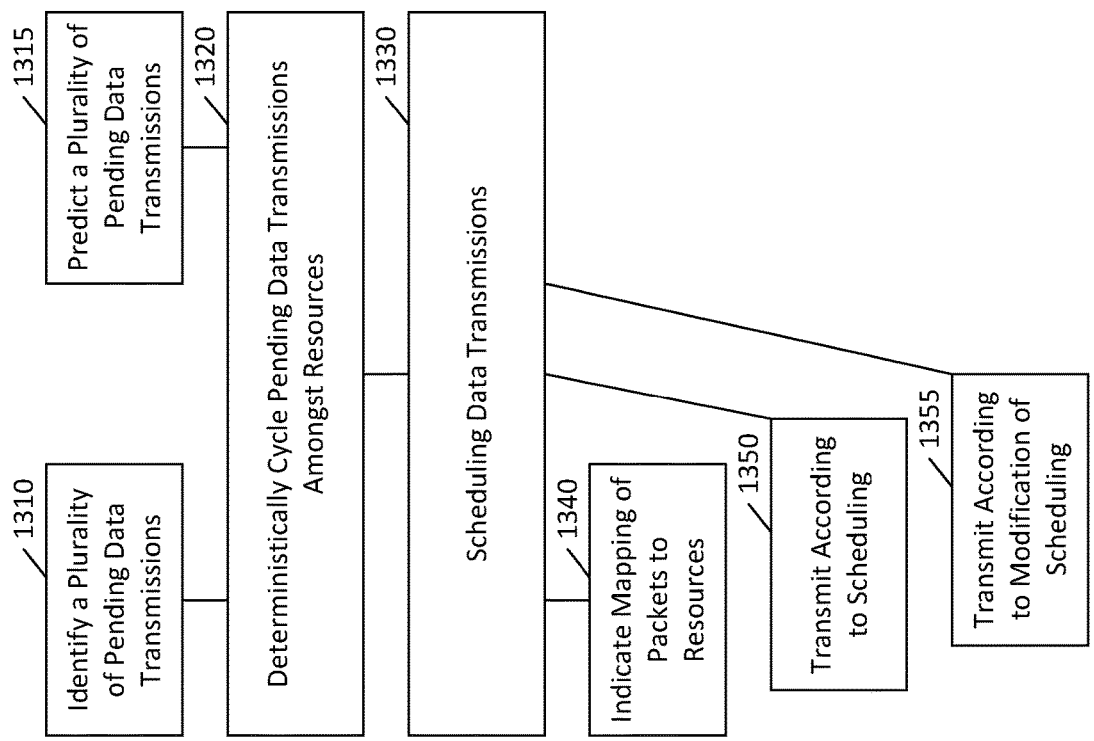
FIG. 13 illustrates a method according to certain embodiments.

As shown in FIG. 13, a method can include, identifying 1310 or predicting 1315 a plurality of pending data transmissions. As an example, the identifying 1310 can be done by a user equipment that is going to send transmissions, whereas the predicting 1315 may be done by an access node, such as an eNB that is going to receive the transmissions.

The method can also include deterministically cycling 1320 the pending data transmissions among a plurality of available resources. This can be accomplished from the UE side by sending the transmissions according to a sequence or schedule. Likewise, this can be accomplished from the eNB side by scheduling the resources for the UE to send the transmissions. The plurality of available resources may be more than one set of available resources, but other options are also possible. For example, the cycling can be done with a single set of available resources and a plurality of data transmissions. Thus, a plurality of available resources can include the case of a single set of resources available for a plurality of time slots.

The plurality of pending data transmissions can include a first packet and a second packet, or generally more than one packet. In this case, for example, cycling 1320 can include alternating between the packets or between hybrid automatic repeat request processes for the packets ("alternating between" here can also broadly refer to taking turns among more than two packets in cases where there are more than two packets). The multiple packets could be multiple segments of the same data packet mapped to separate transport blocks and hence HARQ processes. The plurality of available resources can be time domain resources, and the cycling can involve interweaving transmissions in the time domain. Simple examples of these principles can be seen in FIGS. 3a and 3b, discussed above.

The plurality of available resources can also include frequency domain resources, carrier domain resources, and/or spatial domain resources. The cycling can include interweaving transmissions in the frequency domain, the carrier domain, the spatial domain, and/or the time domain. An example of these principles is illustrated in FIG. 4.

The plurality of data transmissions can include different hybrid automatic repeat request processes and/or different data blocks.

The cycling 1320 can include scheduling 1330 the plurality of data transmissions to a receiving device. For example, an eNB can schedule a UE to send the transmissions to the eNB. Alternatively, the UE can autonomously select the transmissions to the eNB using some pre-configured resources, such as GUL resources.

The scheduling can include at least one of providing each data transmission with related downlink control information for the data transmission itself only (see, for example, FIG. 5), providing a data transmission (for example, each data transmission) with related downlink control information for a plurality of re-transmissions of the corresponding data packet (see, for example, FIG. 6), or providing each data transmission with related downlink control information for a plurality of data packets, including their re-transmissions (see, for example, FIG. 7).

As shown in FIG. 13, the method can further include indicating 1340, to a receiving device, a mapping of packets to available resources for the data transmissions. The indicating 1340 can include at least one of providing an independent indication for each uplink resource or transmission instance (see, for example, GUL UL Option 1 in FIG. 8), providing a separate indication for each hybrid automatic repeat request process with information for all transmission instances of the process (see, for example, GUL UL Option 2 in FIG. 8), or providing full information for an entire transmission burst (see, for example, GUL UL Option 3 in FIG. 8).

As mentioned above, the cycling 1320 can include transmitting 1350, according to scheduling, the plurality of data transmissions. The scheduling can include at least one of receiving for a data transmission related downlink control information for the data transmission itself only (see, for example, UL HRLL Option 1A, discussed above), receiving related downlink control information for a plurality of re-transmissions of a corresponding data packet (see, for example, UL HRLL Option 1B, discussed above), or receiving for each data transmission related downlink control information indicative of the scheduling of a plurality of data packets including their retransmissions (see, for example, UL HRLL Option 1C, discussed above).

The cycling can include transmitting 1355, according to a modification of scheduling, the plurality of data transmissions (see, for example, FIG. 9). The modification of scheduling can be at least one of provided independently for each transmission instance (see, for example, FIG. 10), provided separately for each hybrid automatic repeat request process with information for all transmission instances of the process (see, for example, FIG. 11), or provided for an entire transmission burst (see, for example, FIG. 12). The modification of the scheduling and provision of such can involve the UE signaling the modification to the network.

Figure 14:
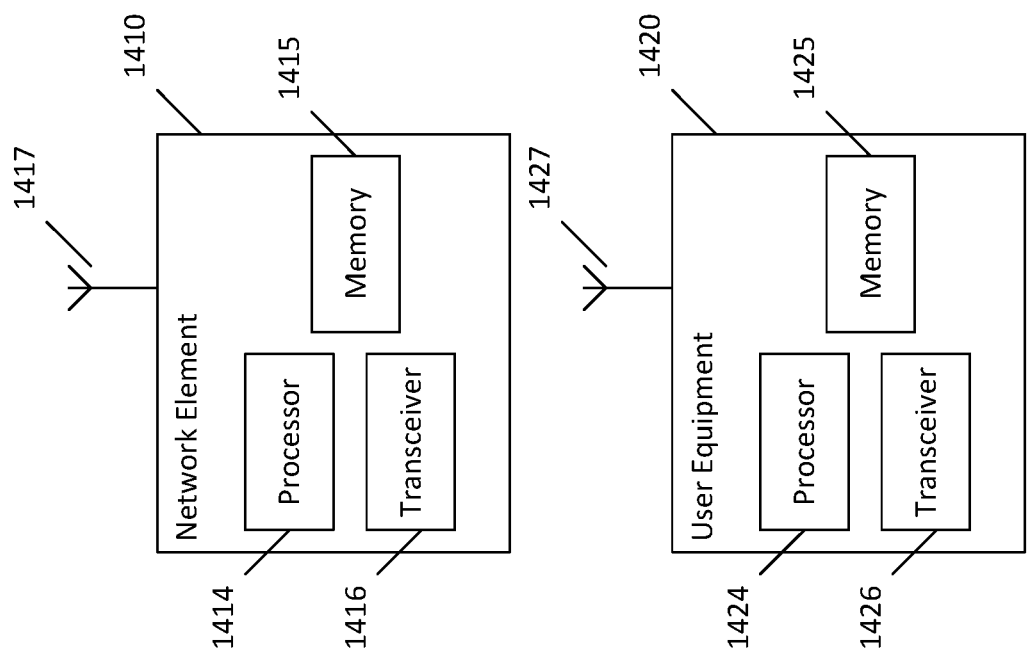
FIG. 14 illustrates a system according to certain embodiments.

FIG. 14 illustrates a system according to certain embodiments of the invention. It should be understood that each block of the flowchart of FIG. 13 may be implemented by various means or their combinations, such as hardware, software, firmware, one or more processors and/or circuitry. In one embodiment, a system may include several devices, such as, for example, network element 1410 and user equipment (UE) or user device 1420. The system may include more than one UE 1420 and more than one network element 1410, although only one of each is shown for the purposes of illustration. A network element can be an access point, a base station, an eNode B (eNB), or any other network element, such as a PCell base station or a PSCell base station. Each of these devices may include at least one processor or control unit or module, respectively indicated as 1414 and 1424. At least one memory may be provided in each device, and indicated as 1415 and 1425, respectively. The memory may include computer program instructions or computer code contained therein, for example for carrying out the embodiments described above. One or more transceiver 1416 and 1426 may be provided, and each device may also include an antenna, respectively illustrated as 1417 and 1427. Although only one antenna each is shown, many antennas and multiple antenna elements may be provided to each of the devices. Other configurations of these devices, for example, may be provided. For example, network element 1410 and UE 1420 may be additionally configured for wired communication, in addition to wireless communication, and in such a case antennas 1417 and 1427 may illustrate any form of communication hardware, without being limited to merely an antenna.

Transceivers 1416 and 1426 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. It should also be appreciated that according to the "liquid" or flexible radio concept, the operations and functionalities may be performed in different entities, such as nodes, hosts or servers, in a flexible manner. In other words, division of labor may vary case by case. One possible use is to make a network element to deliver local content. One or more functionalities may also be implemented as a virtual application that is provided as software that can run on a server.

A user device or user equipment 1420 may be a mobile station (MS) such as a mobile phone or smart phone or multimedia device, a computer, such as a tablet, provided with wireless communication capabilities, personal data or digital assistant (PDA) provided with wireless communication capabilities, vehicle, portable media player, digital camera, pocket video camera, navigation unit provided with wireless communication capabilities or any combinations thereof. The user device or user equipment 1420 may be a sensor or smart meter, or other device that may usually be configured for a single location.

In an exemplifying embodiment, an apparatus, such as a node or user device, may include means for carrying out embodiments described above in relation to FIGS. 3a, 3b, and 4-12.

Processors 1414 and 1424 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors. Additionally, the processors may be implemented as a pool of processors in a local configuration, in a cloud configuration, or in a combination thereof. The term circuitry may refer to one or more electric or electronic circuits. The term processor may refer to circuitry, such as logic circuitry, that responds to and processes instructions that drive a computer.

For firmware or software, the implementation may include modules or units of at least one chip set (e.g., procedures, functions, and so on). Memories 1415 and 1425 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 1410 and/or UE 1420, to perform any of the processes described above (see, for example, FIG. 13). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments of the invention may be performed entirely in hardware.

Furthermore, although FIG. 14 illustrates a system including a network element 1410 and a UE 1420, embodiments of the invention may be applicable to other configurations, and configurations involving additional elements, as illustrated and discussed herein. For example, multiple user equipment devices and multiple network elements may be present, or other nodes providing similar functionality, such as nodes that combine the functionality of a user equipment and an access point, such as a relay node.

Certain embodiments may have various benefits and/or advantages. For example, for HRLL operation on unlicensed band the effect of failed channel access/LBT on the delay performance may be minimized. The same may hold for licensed band operation in general, and the case of varying collisions as well as potential UL TX power limitations not allowing use of all the configured resources. Moreover, as noted above, the cycling, may also have advantages for licensed band operation, including scheduling based transmission, to enable the transmission of all the data packets as early as possible, to decrease the latency while still enabling blind repetition operation.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

LISTING OF ABBREVIATIONS

CCA Clear channel assessment
DCI Downlink control information
DL Downlink
GUL Grant-less Uplink
HARQ Hybrid automatic repeat request
HRLLC High reliable low latency communication
LBT Listen-before-talk
PRACH Physical random access channel
PUSCH Physical uplink shared channel
SPS Semi-persistent-scheduling
TB Transport block
TTI Transmission Time Interval
UCI Uplink control information
UE User equipment
UL Uplink
URLLC Ultra Reliable Low Latency Communication

We claim:
1. A method, comprising:
   identifying or predicting a plurality of pending data transmissions;
   deterministically cycling the pending data transmissions among a plurality of available resources wherein the plurality of available resources comprise time domain resources, frequency domain resources, carrier domain resources, or spatial domain resources,
      wherein the plurality of pending data transmissions comprise more than one data packet, wherein the cycling comprises alternating between the data packets or between hybrid automatic repeat request processes for the data packets; and
   indicating, to a receiving device, a mapping of packets to the available resources for the data transmissions, wherein the indicating comprises at least one of providing an independent indication for each uplink resource or transmission instance, and providing a separate indication for each hybrid automatic repeat request process with information for all transmission instances of the each hybrid automatic repeat request process.
2. The method of claim 1, wherein the cycling comprises interweaving transmissions in the time domain, the frequency domain, the carrier domain, the spatial domain, or combinations thereof.

3. The method of claim 1, wherein the plurality of data transmissions comprise different data packets or different hybrid automatic repeat request processes for the data packets.

4. The method of claim 1, wherein the cycling comprises scheduling the plurality of data transmissions to the receiving device, wherein the scheduling comprises at least one of providing a data transmission with related downlink control information for the data transmission itself only, providing a data transmission with related downlink control information for a plurality of re-transmissions of a corresponding data packet, or providing a data transmission with related downlink control information for a plurality of data packets, including their re-transmissions.

5. The method of claim 1, wherein the indicating further comprises providing full information for an entire transmission burst.

6. The method of claim 1, wherein the cycling comprises transmitting, according to scheduling, the plurality of data transmissions, wherein the scheduling comprises at least one of receiving for a data transmission related downlink control information for the data transmission itself only, receiving related downlink control information for a plurality of re-transmissions of a corresponding data packet, or receiving a downlink control information indicative of the scheduling of a plurality of data packets, including their re-transmissions.

7. The method of claim 1, wherein the cycling comprises transmitting, according to a modification of scheduling, the plurality of data transmissions, wherein an indication of the modification of scheduling is at least one of provided independently for each transmission instance, provided separately for each hybrid automatic repeat request process with information for all transmission instances of the each hybrid automatic repeat request process, or provided for an entire transmission burst.

8. The method of claim 1, wherein the cycling comprises transmitting, according to a modification of scheduling, the plurality of data transmissions, wherein the scheduling comprises at least one of receiving for a data transmission related downlink control information for the data transmission itself only, receiving related downlink control information for a plurality of re-transmissions of a corresponding data packet, or receiving a downlink control information indicative of the scheduling of a plurality of data packets, including their re-transmissions.

9. The method according to claim 1, wherein the pending data transmissions have a low latency requirement.

10. An apparatus, comprising:
at least one processor; and
at least one memory including computer program code,
wherein the at least one memory and the computer program code are configured to, with the at least one processor, cause the apparatus at least to identify or predict a plurality of pending data transmissions;
deterministically cycle the pending data transmissions among a plurality of available resources wherein the plurality of available resources comprise time domain resources, frequency domain resources, carrier domain resources, or spatial domain resources,
wherein the plurality of pending data transmissions comprise more than one data packet, wherein the cycling comprises alternating between the packets or between hybrid automatic repeat request processes for the data packets; and
indicate, to a receiving device, a mapping of packets to the available resources for the data transmissions, wherein the indicating comprises at least one of providing an independent indication for each uplink resource or transmission instance, and providing a separate indication for each hybrid automatic repeat request process with information for all transmission instances of the each hybrid automatic repeat request process.

11. The apparatus of claim 10, wherein the cycling comprises interweaving transmissions in the time domain, in the frequency domain, the carrier domain, the spatial domain, or combinations thereof.

12. The apparatus of claim 10, wherein the plurality of data transmissions comprise different data packets or different hybrid automatic repeat request processes for the data packets.

13. The apparatus of claim 10, wherein the cycling comprises scheduling the plurality of data transmissions to the receiving device, wherein the scheduling comprises at least one of providing a data transmission with related downlink control information for the data transmission itself only, providing a data transmission with related downlink control information for a plurality of re-transmissions of a corresponding data packet, or providing a data transmission with related downlink control information for a plurality of data packets, including their re-transmissions.

14. The apparatus of claim 10, wherein the indicating further comprises providing full information for an entire transmission burst.

15. The apparatus of claim 10, wherein the cycling comprises transmitting, according to scheduling, the plurality of data transmissions, wherein the scheduling comprises at least one of receiving for a data transmission related downlink control information for the data transmission itself only, receiving related downlink control information for a plurality of re-transmissions of a corresponding data packet, or receiving a downlink control information indicative of the scheduling of a plurality of data packets, including their re-transmissions.

16. The apparatus of claim 10, wherein the cycling comprises transmitting, according to a modification of scheduling, the plurality of data transmissions, wherein an indication of the modification of scheduling is at least one of provided independently for each transmission instance, provided separately for each hybrid automatic repeat request process with information for all transmission instances of the each hybrid automatic repeat request process, or provided for an entire transmission burst.

17. The apparatus of claim 10, wherein the cycling comprises transmitting, according to a modification of scheduling, the plurality of data transmissions, wherein the scheduling comprises at least one of receiving for a data transmission related downlink control information for the data transmission itself only, receiving related downlink control information for a plurality of re-transmissions of a corresponding data packet, or receiving a downlink control information indicative of the scheduling of a plurality of data packets, including their re-transmissions.

18. The apparatus according to claim 10, wherein the pending data transmissions have a low latency requirement.

* * * * *